Figure 2:
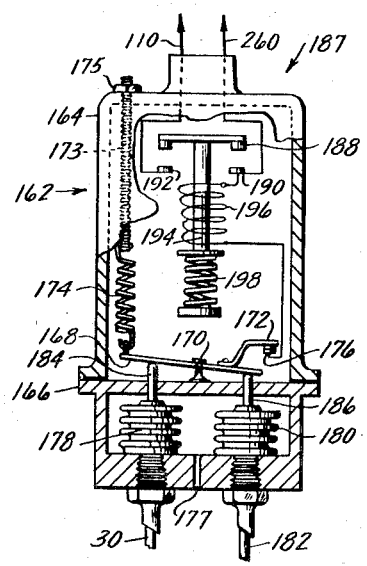

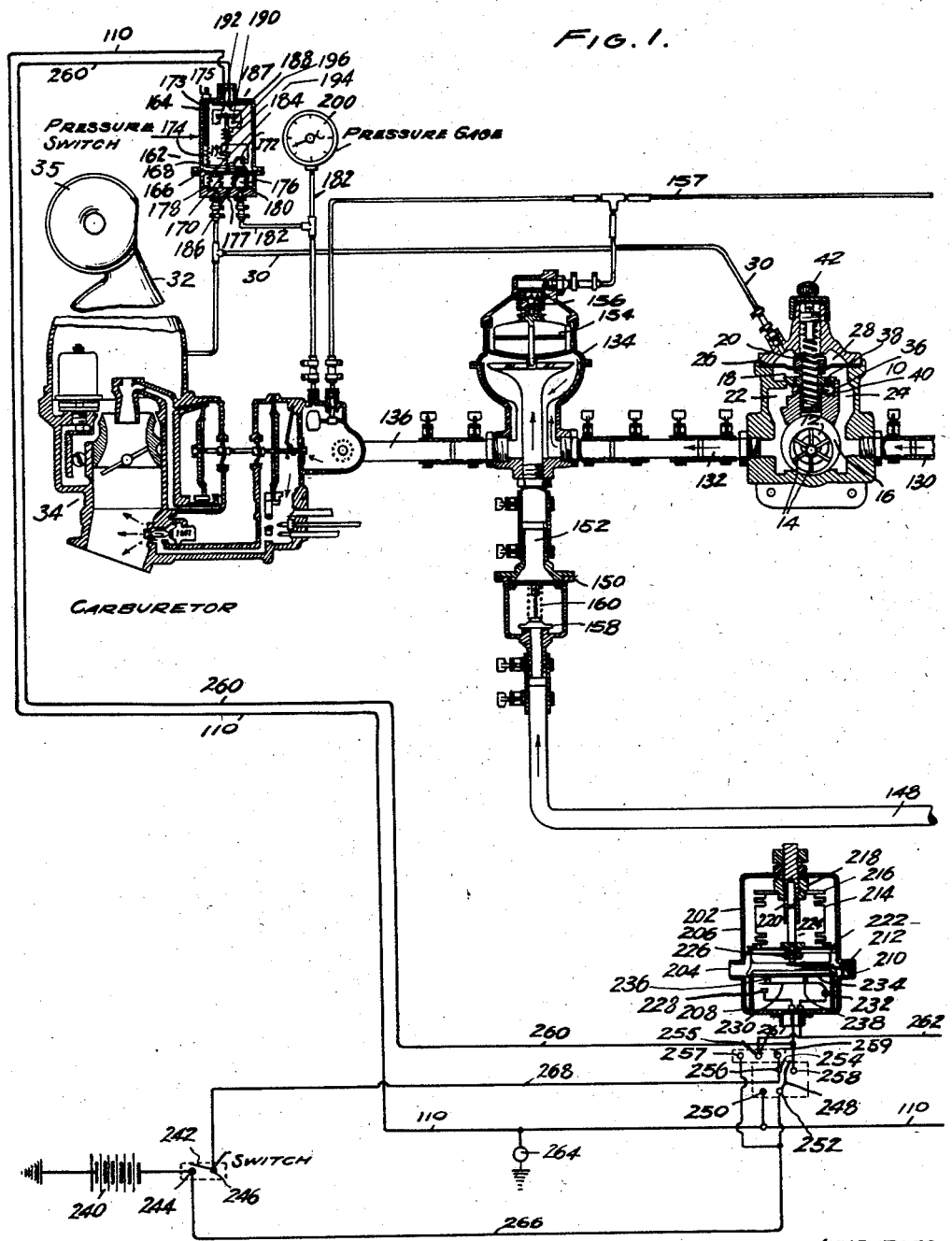

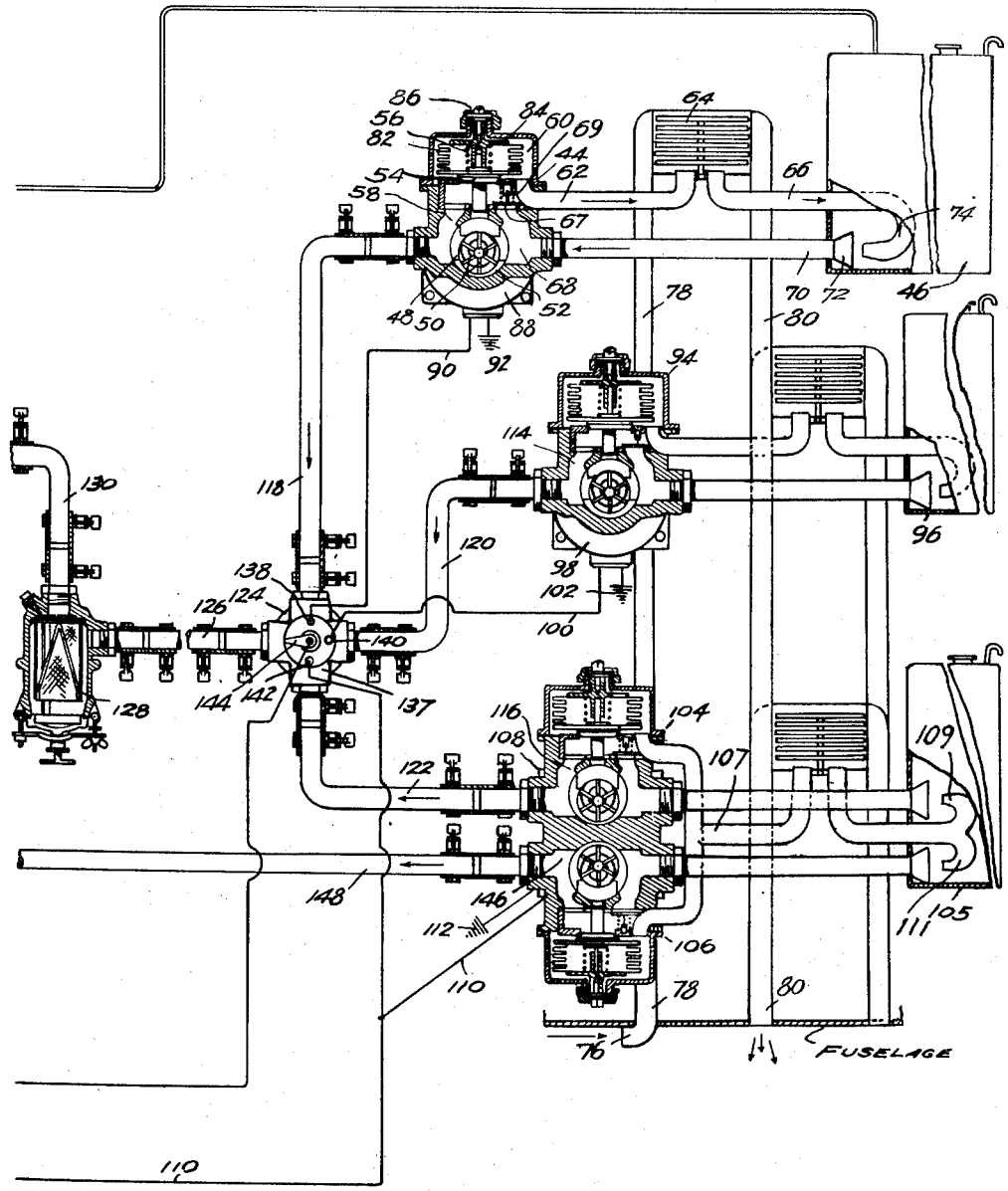

Feb. 17, 1948. D. SAMIRAN ET AL 2,435,982
FUEL SYSTEM FOR AIRCRAFT
Filed July 9, 1943 3 Sheets-Sheet 3

INVENTORS
DAVID SAMIRAN
BY JOHN S. MILLS
ATTORNEYS

Patented Feb. 17, 1948

2,435,982

UNITED STATES PATENT OFFICE 2,435,982

FUEL SYSTEM FOR AIRCRAFT

David Samiran, Osborn, and John S. Mills, Bryan, Ohio

Application July 9, 1943, Serial No. 494,128

11 Claims. (Cl. 158—36.4)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft fuel systems, and particularly to a system employing a plurality of fuel tanks and having means adapting it to operation at high altitudes.

The complication which is introduced into an aircraft fuel system by change in altitude and consequent change in atmospheric pressure is well known, and much effort has been directed to improving apparatus whereby an unbroken mass of fuel under a constant pressure may be maintained at the carburetor or similar fuel metering device in spite of the greatly varying atmospheric pressure on the fuel in the vented tanks.

It is therefore an object of this invention to provide booster means which will become automatically operative to take fuel from the tanks and deliver it at increased pressure into the engine pump suction line before the drop in atmospheric pressure due to increasing altitude creates such an equivalent suction head for the engine pump as may cause cavitation at the suction side thereof.

But, in spite of the provision of the booster means above indicated, an altitude may ultimately be reached at which the fuel boils in the fuel tanks, so that no matter what sort of booster means has been provided for taking fuel from the tanks and delivering it under an increased pressure to the engine pump inlet, it becomes difficult to separate the liquid from the vapor bubbles in the tanks so that an unbroken mass of fuel may be taken by the booster means.

It is therefore another object of this invention to provide means, preferably within the tanks, which may separate vapor bubbles from the fuel and thus take an unbroken mass of fuel from a tank, even when the altitude is so high that the fuel has already started to boil in the tank from which it is being taken.

More specifically, an object of the invention is to provide a fuel system in which there is an engine driven pump and a plurality of fuel tanks either of which is connectable to the suction side of said pump, a separate electric motor driven booster pump associated with each tank, each to pump fuel from its tank to the suction side of the engine pump, an aneroid valve to sense when the altitude is great enough to make booster assistance to the engine pump advisable and thereupon automatically start the booster pump of the connected tank, an auxiliary pump controlled by a pressure responsive switch whereby fuel is supplied directly to the carburetor whenever and for such time as the engine pump fails to maintain a predetermined pressure at the carburetor, as when it has emptied the tank to which it is connected and connection to a full tank has not yet been made, and a means associated with each booster pump and its tank to minimize boiling in the tank itself at higher altitudes than are possible with present equipment.

Other objects and advantages will become more apparent as the invention is further described and reference is made to the drawing, in which Figs. 1 and 1a are two parts of a schematic view showing the arrangement of the various elements of the improved fuel system, together with the electrical circuits required in their operation.

Figure 3:
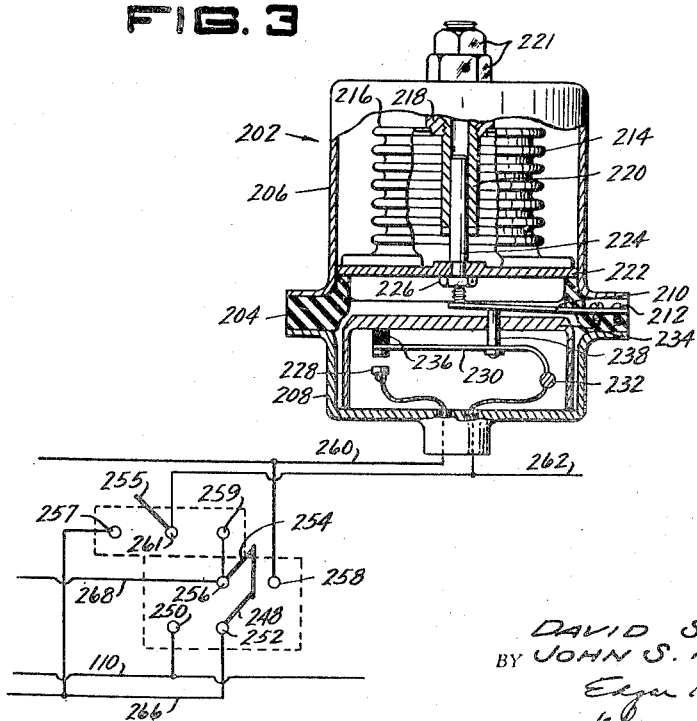

Figs. 2 and 3 show several of the electric switches of Fig. 1 to a larger scale for clearness.

Like numerals refer to like parts throughout the drawing.

In the embodiment of the invention herein shown and described, the engine pump 10 is of the sliding vane type comprising a rotor 12 with radially slidable vanes 14 rotating in an offset bore cylinder 16. A relief valve 18, normally held closed by a spring 20, is lifted against the resistance of the spring at a preselected pressure in the discharge side 22, whereupon the excess capacity of the pump may return to the suction side 24 through the valve. The relief valve is of the balanced type, and therefore includes a flexible diaphragm 26 which partitions off a chamber 28, which is connected by a pipe 30 to the air intake 32 of the carburetor 34, where a supercharger 35 maintains sea level pressure at all altitudes, whereby the pressure at the discharge side of the pump is kept uniform regardless of varying altitude. The valve and diaphragm arrangement shown, as is well known, renders the relief valve substantially insensible to the small changes in suction head due to pitch or slip. For convenience in description, the term "supercharger-controlled relief valve," when hereinafter employed, will be considered as referring to the relief valve and carburetor connection, shown associated with the engine pump 10, or to its mechanical equivalent. It is further noted that the term "carburetor," when hereinafter employed, is intended to include any fuel metering device which requires that fuel be brought to it under a predetermined pressure.

A bypass for the fuel consisting of a disc valve 36 held in place over a circular row of holes 38 in the valve 18 by a spring 40, allows fuel to pass from the suction side 24 to the discharge side 22 while the rotor 12 is not turning. An adjusting screw 42 may be used to vary the tension of the spring 20 and thus hold the pressure in the discharge side 22 at a selected value. The pump 10 is preferably driven by the aircraft engine or by some shaft rotated by the engine. The engine pump 10 with its balanced supercharger-controlled relief valve 18 and its bypass valve 36 is presently in commercial use in aircraft fuel systems.

A booster pump 44, also of the sliding vane type, pumps from a tank 46 and comprises a rotor 48 with vanes 50 in the offset bore cylinder 52. A relief valve 54, normally held closed by a spring 56, is lifted against the resistance of the spring when a preselected pressure has built up on the discharge side 58, whereupon the excess capacity of the pump enters the chamber 60, from whence it may return to the tank 46 through the radiator inlet pipe 62, radiator 64 and radiator outlet pipe 66, instead of returning directly into the suction side 68, as is done in the engine pump heretofore described. A bypass for the fuel, consisting of a disc valve 67, normally held closed by a spring 69, allows fuel to pass from the suction side 68 to the discharge side 58 when the rotor 48 is not turning. The suction side of the booster pump is connected to the tank 46 at the bottom by the pipe 70, the end 72 of which flares to a somewhat larger diameter within the tank. The end 74 of the pipe 66 is formed into a nozzle and directed into the center of the flared end 72 whereby a jet is formed, since the excess capacity of the booster pump 44 causes returning fuel to discharge from the nozzle 74 at considerable velocity. An air scoop 76 may extend from the underside of the fuselage in order to bring cooling air up the pipe 78 to the radiator, the air passing through the radiator, then being discharged through the pipe 80.

The spring 56 is inclosed and sealed in the Sylphon 82. The top of the Sylphon is sealed to a flanged hub 84, which is vertically adjustable by means of the screw 86. The bottom of the Sylphon is sealed to the valve 54. Before sealing the Sylphon, it is preferably filled with atmosphere at sea level pressure, whereby the valve 54 is aneroid controlled, since the pressure in the chamber 60 will decrease with that in the tank 46 as altitude increases. Since expansion of the spring 56 is opposed by the pressure in the chamber 60, which tends to shorten the Sylphon, the valve 54 is held shut the tighter as the pressure drops with increased altitude. In this way the pressure which the booster pump delivers to the engine pump inlet remains substantially constant until an altitude is reached, at which the fuel starts to boil in the tank. For convenience in description, the term "aneroid-controlled relief valve," when hereinafter employed, will be taken to refer to the relief valve in the booster pump 44 or to its mechanical equivalent.

The altitude at which the fuel starts to break up in the tank itself is usually considered the maximum attainable by aircraft, even where a booster pump system is used, but, with the arrangement shown, the fuel ejected from the nozzle 74 has been cooled to a considerably lower temperature than that in the tank, and this, together with the manner in which fuel enters the opening 72, enables a supply of unbroken fuel to be delivered to the inlet side 68 of the booster pump at an altitude considerably in excess of that now considered maximum. The booster pump 44 is driven by an electric motor 88, current being brought to the motor through the conductor 90 and returned through a ground 92.

A second booster pump 94 pumps from a second tank 96, the pump with its aneroid controlled valve, and the radiator and piping all being duplicates of those described with reference to the pump 44. The second booster pump 94 is driven by an electric motor 98, current being brought to the motor through the conductor 100 and returned through a ground 102.

The third and fourth pumps 104 and 106, both of which pump out of the tank 105, are built together in a single block and are driven by a single motor 108 but are otherwise constructed like the pump 44, which was hereinbefore described in detail. The excess fuel, however, from both pumps 104 and 106 is returned to the tank by way of a common T pipe 107, which has two nozzles 109 and 111, discharging into the two pump inlets.

But, while the four pumps 44, 94, 104 and 106 are alike in structure, there is a difference in function between the first three and the fourth. Pumps 44, 94 and 104 function as booster pumps, pumping to the suction side of the engine pump 10 to decrease its equivalent suction head, while pump 106 is more in the nature of an auxiliary pump, pumping into the discharge side of the engine pump 10 whenever the engine pump for any reason is not delivering the full pressure for which its relief valve is set. For this reason, the three pumps 44, 94 and 104 will hereinafter be referred to as booster pumps, while pump 106 will be called the auxiliary pump. Motor 108 which operates both pumps 104 and 106 has current brought to it through a conductor 110 and returned through a ground 112.

The discharge sides 58, 114 and 116 of the three pumps 44, 94 and 104 are connected respectively by piping 118, 120 and 122 to a three-way tank selector valve 124, which, in its three open positions, directs fuel from one at a time of the three pipes 118, 120 and 122 into the pipe 126, through a conventional strainer 128 into the inlet pipe 130 of the engine pump 10, through the pump 10, piping 132, air eliminator 134 and piping 136 to the carburetor 34.

Combined with the tank selector valve 124 is an electric booster motor switch 137, which also has three "on" contacts 138, 140 and 142, to which are connected the electrical conductors 90, 100 and 110, respectively. The relation of the valve plug to the switch arm 144 in such that when the valve is so positioned that it connects the discharge side of any one of the pumps to the engine pump inlet, the motor of that pump will be connected for rotation.

The discharge side 146 of the remaining pump 106, which has been called the auxiliary pump, is connected by piping 148 to a check valve 150, thence through piping 152 to an air eliminator 134 and through piping 136 to the carburetor 34. The air eliminator 134 is shown and described in copending application, Serial No. 475,683, filed February 12, 1943, and which became Patent No. 2,406,854 on September 3, 1946 (see Fig. 3 of that patent). The structure shown in that patent comprises means to receive liquid fuel through two pipes 132 and 152; separate the air or vapor bubbles from the liquid by means of the float 154 and needle valve 156; return the air or vapor through the pipe 157 to the top of the tank 46; and discharge an unbroken volume of liquid into the pipe 136. The carburetor itself is float vented in the usual manner through the pipe 157.

The check valve 150 includes a valve head 158, normally held on its seat by a spring 160 to prevent fuel returning to the pump 106 through the pipe 148.

A pressure responsive switch 162 comprises a casing 164 having a horizontal partition 166 of metal upon which a metal switch bar 168 is rockable on a fulcrum 170 placed midway of its length. The bar 168, at one end, has a contact member 172, while the other end is drawn upwardly by an extension spring 174 adjustable to the desired tension by the screw 173 and nut 175. A second contact member 176 is insulatedly affixed to the casing in such a position that rocking of the bar 168 makes and breaks contact between contact members 172 and 176.

For rocking the bar 168, a pair of Sylphons 178 and 180 are sealed to the floor of the casing over the ends of pipes 30 and 182, respectively, and covers are then sealed to the Sylphons over the upper ends. The covers carry the stems 184 and 186 of metal, which they hold against the underside of the bar 168 by pressure of considerable intensity, which is at all times present in the Sylphons. The pipe 30, being connected into the carburetor air intake 32 is at all times subject to the supercharger pressure. The spring 174 is preferably so adjusted that the Sylphon 180 will ordinarily expand and open the contacts 172 and 176 at about fifteen pounds pressure when at sea level, but since the exterior surfaces of the Sylphons are exposed to atmosphere through the opening 177, the upward force of the Sylphon 180 to open the contacts 172 and 176 becomes greater as the altitude increases, but since the upward force of the Sylphon 178 also increases with increase in altitude, the fuel pressure, at which the contacts 172 and 176 open, remains constant for all altitudes.

In the upper end of the casing 164 is a second switch 187 which comprises a conductive bar 188, the ends of which are movable into and out of engagement with contacts 190 and 192 by a solenoid core 194, which is acted upon by a solenoid coil 196. The solenoid coil is energized by having one end electrically connected to the contact 190 and the other end to the contact 176. A spring 198 holds the switch 187 open when the coil 196 is not energized. A pressure gauge 200 is connected to the fuel intake of the carburetor by the same piping 182 which extends to the Sylphon 180.

The main function of the pressure responsive switch 162 is to sense a pressure drop in the discharge line of the engine pump 10 and to automatically connect the auxiliary pump motor 108 to the battery, then disconnect it again when the engine pump regains its normal discharge pressure. Inasmuch as the pressure at which the switch 162 becomes operative is kept uniform for all altitudes because of its connection to the supercharger pressure in the carburetor intake, the term "supercharger-controlled pressure responsive switch" will hereinafter be understood to have reference to switch 162 or its equivalent.

An aneroid switch 202 comprises an insulation disc 204 with a top cover member 206 and a bottom cover member 208 secured thereto. A flat spring 210 is fastened to the disc by screws 212, the free end of the spring being tensioned to spring upwardly. A Sylphon 214 is sealed to a top plate 216 having an internally threaded hub 218 into which a guide piece 220 is screwed. Nuts 221 hold the guide piece positioned in the top cover member 206. The lower end of the Sylphon is sealed to a disc 222 which carries a stem 224 which is slidable in the guide piece 220. The stem 224 is held in the disc 222 by a nut 226, the lower end of the stem resting on the free end of the flat spring 210.

A contact 228 is insulatedly held in fixed position in the bottom cover 208. A second contact 230 is insulatedly supported in the casing at 232. A partitioning member 234 carries a stop 236 for limiting the gap between the contacts 228 and 230, and a vertically slidable plunger 238, by which movement of the spring 210 is transferred to the contact member 230.

The main function of the aneroid switch 202 is to sense when an altitude has been reached wherein the pressure drop on the surface of the fuel in the vented fuel tanks is making it difficult for the engine pump to lift the fuel to its suction side without cavitation, and to automatically connect a booster pump unit to the current source, then disconnect it again when the altitude is sufficiently decreased.

A battery 240 supplies electrical energy for operating the electrical parts of the system. A conventional manual switch 242, when closed, connects post 244 to post 246. A priming switch 248, when closed, connects posts 250 and 252, for bringing electric current to the motor 108 of the auxiliary pump 106 for priming the carburetor before the manual switch 242 is closed and before the pressure responsive switch 162 and aneroid switch 202 become operative. A manual control switch 254 connects posts 256 and 258, whereby current is supplied to the contact 228 of the aneroid switch 202 and to the contact 176 of the pressure responsive switch 162 for controlling automatic operation. The switches 248 and 254 are insulatedly joined together so that one cannot be closed without opening the other. A third manually operable double throw switch 255, which for purposes of identification, may be called the "test and emergency" switch, may be closed either on to the contact 257 for bringing current to the booster electric motor circuits before the manual switch 242 is closed when testing their pressure capacity, in which case it serves as a test switch, or on to the contact 259 for bringing current to the booster electric motor circuits when the manual switch 242 is closed, for substituting the booster units for a jammed or otherwise damaged engine pump, in which case it serves as an emergency switch.

A conductor 260 connects the contact 190 of the pressure switch 187 to the contact 228 of the aneroid switch 202 and to the post 258 of the manual switch 254. The conductor 110 connects the contact 192 of the pressure responsive switch 187 to the post 250 of the priming switch 248, to the motor 108 of the booster pump 106, and to the contact 142 of the booster motor switch 137. A conductor 262 connects the contact 230 of the aneroid switch to the arm 144 of the booster motor switch 137 and to the center post 261 of the double throw manual switch 255. A conductor 266 connects the post 244 of the manual switch 242 to the post 257 of the double throw manual switch 255 and to the post 252 of the priming switch 248, and a conductor 268 connects the post 246 of the manual switch to the post 256 of the manual switch 254 and the post 259 of the double throw manual switch 255. An electric signal light 264 has one terminal attached to the conductor 110 and the other grounded.

The system should be operated substantially as follows:

In order to make certain that the electrically driven pumps are all operative, the operator may close the test switch 255 on to the contact 257. Current will now flow from the battery through 266, 255, and 262 to the switch arm 144. By successively turning the switch arm on to the several contacts 138, 140 and 142, the booster pump motors 88, 98 and 108 should revolve one after the other, the gauge 200 indicating whether the pumps are moving fuel. This test having been made, the switch 255 may be taken off the contact 257.

Except when the system has been operated but a short time previously, one should next close the priming switch 248 on to the contact 250. This will bring current through conductors 266 and 110 to operate the motor 108, whereby the auxiliary pump 106 will supply fuel through pipe 148, check valve 150, pipe 152, air eliminator 134, pipe 136 to the carburetor 34. Since the relief valve of the pump 106 is set to about ten pounds, the carburetor will be primed at substantially the same pressure. This pressure acts on the gauge 200 and on the Sylphon 180 of the pressure switch 162. The Sylphon, however, will not expand at this time, it being set to expand at about fifteen pounds pressure. The contacts 172 and 176 for the time being, therefore, remain together. The priming switch 248 may now be taken off the contact 250.

Since the booster pump 104 is drivably connected to the same motor 108 as the auxiliary pump 106, the booster pump 104 will rotate while the auxiliary pump is priming the carburetor. But no harm will result for the reason that, if the discharge side of the pump 104 is closed by the selector valve 124, its output of fuel will merely circulate through its relief valve, while if the tank selector valve 214 happens to be turned to a position which connects tank 105 to the suction side of the engine pump 10, the booster pump 104 will merely pump fuel through the bypass valve 36 of the engine pump to the carburetor at the same pressure, about ten pounds, as is being supplied by the auxiliary pump. Priming will therefore be effected by one or the other of the pumps 104 or 106.

Having primed the engine with the pump 106, it should be further conditioned for starting by closing the manual switch 242 on to the contact 244. The manual switch 254 should then be closed on to the contact 258, whereby current flows from the conductor 268 through conductor 260, solenoid coil 196, bar 168, to the grounded spring 174, whereby the switch bar 188 is drawn down to connect the contacts 190 and 192, thereby bringing current through conductor 110 to the motor 108, which will then operate the auxiliary pump 106 and thereby maintain the pressure of ten pounds at the carburetor until the engine pump 10 can raise it to a higher value.

It should be noted that, while the auxiliary pump 106 was operated by closing the priming switch 248, it was stopped manually by opening the same switch after priming was effected, but when the manual switch 254 is closed on to the contact 258, the pressure responsive switch 162 is brought into action, after which the pump 106 is stopped or started by a rise or fall in pressure at the gauge 200. The closing of the switch 254 also brings current through conductor 268 to the contact 228 of the aneroid switch 202 through which it will subsequently pass to the switch 137 by means of which a booster pump motor is selected. Closing of the switch 254 on to the contact 258, therefore, also brings into play the aneroid switch 202 which restrains booster pump action until an altitude is reached which requires it. The manual switch 254 is left closed on the contact 258 as long as it is desired to operate automatically.

When the engine starts, the engine pump 10 will be rotated and the tank selector valve 124 should now be turned to connect one or another of the three tanks to the suction side of the engine pump. Assume, for instance, the tank selector valve 124 is turned to connect the tank 46 through the booster pump 44 to the suction side 24 of the engine pump 10. The arm 144 of the booster motor switch 137 will now be on the contact 138, but the booster motor 88 will not at this time rotate, nor is it desirable that it should, because the altitude is not now sufficient to require booster assistance to the engine pump. The aneroid switch is therefore so arranged that contacts 228 and 230 will be separated and will not be brought together except at a predetermined higher altitude.

The engine pump, at this low altitude, will therefore draw fuel from the tank 46, through the bypass valve 67, while the booster pump 44 is not rotating. Since the relief valve 18 of the engine pump is set at fifteen pounds, the carburetor pressure will almost instantly be raised to fifteen pounds.

As soon as this occurs, the Sylphon 180 will expand and open the contacts 172 and 176, whereby the bar 188 is raised by the spring 198 and the auxiliary pump motor 108, which up to this time has been receiving current through the bar 188, now stops, thus stopping the auxiliary pump 106, this pump being no longer needed with the engine pump operating to deliver the high pressure. But since the relief valve of the auxiliary pump 106 is set at ten pounds, the check valve 150 is provided to prevent the higher pressure from the engine pump flowing backward through the relief valve of the auxiliary pump into the tank 105.

If a low enough altitude is maintained, flight may now be continued with the engine pump 10 drawing fuel through the nonrotative booster pump 44, or any other booster pump to which the tank selector valve may be set, and with the auxiliary pump 106 nonrotative. If, however, the predetermined altitude is reached at which the decreased atmospheric pressure on the fuel in the tank 46 taxes the capacity of the engine pump 10 to lift the fuel, the aneroid switch 202 will close the contacts 228 and 230, whereby current will flow from the battery 240 through 242, 268, 254, 258, 260, 228, 230, 262, 144, and 90, to the motor 88. The motor 88 will therefore operate the booster pump 44 as long as this high altitude is being flown.

But when the fuel is exhausted in the tank 46, or other tank from which fuel is being taken, whether the engine pump 10 is at the time drawing fuel through a nonrotating booster pump, or is receiving the assistance of a rotating booster pump, the engine pump will draw air from the tank, which almost instantly will cause the fuel pressure in the gauge 200 and Sylphon 180 to drop to near zero, which will allow pressure switch contacts 172 and 176 to close, thus energizing the solenoid coil 196 which will result in the connection of contacts 190 and 192, whereby current will flow from the battery 240 through 242, 268, 254, 258, 260, and 110, to the motor 108, which operates the auxiliary pump 106.

Since current is now flowing in the conductor 110, the signal light 264 will be lit, and the pilot will know that he is operating off the auxiliary pump 106 at ten pounds pressure instead of the engine pump 10 at fifteen pounds pressure. He will not be absolutely certain of the cause of engine pump failure, since it may be due to a broken engine-pump shaft or broken vanes. But, since, in nearly every case, it is due to an empty tank condition, he will turn the tank selector valve 124 so that the arm 144 moves from the contact 138 to another of the contacts, for example, contact 140.

The reason for placing an air eliminator in the position shown will now be apparent for if there is fuel in the tank 96, to which the engine pump is now connected, the pressure at the carburetor will almost immediately rise to fifteen pounds, that is, it will rise to fifteen pounds as soon as the air eliminator 134 disposes of the air drawn in through the emptied tank 46, whereupon expansion of the Sylphon 180 will shut down the auxiliary pump as before explained, leaving the engine pump to keep up the pressure by drawing fuel from the tank, either through a nonrotating booster pump, if the aneroid switch 202 senses a low altitude, or with the aid of the booster pump if the aneroid switch senses a high enough altitude.

The procedure just described will be repeated when the tank 96 becomes empty, i. e., the tank selector valve may be turned to draw from the remaining tank 105, or if a greater number of tanks are employed, to one after the other until they are all emptied, the auxiliary pump being brought into action each time the engine pump has emptied a tank. It should be noted that the suction pipe of the pump 104 enters the tank 105 considerably above its bottom. Should the operator inadvertently or purposely select the tank 105 as the first from which to draw with the engine pump through the booster pump 104, then when the tank showed "empty" by the signal 264, there would be sufficient fuel left in the tank for the auxiliary pump 106 when it was thereafter needed during the transfer from one tank to another.

Again the operator, with several full tanks, may inadvertently first pump out the tank 105, as far as it may be pumped through pipe 122, then switch to another tank, let us say, the tank 96. Now the aneroid switch is so connected that the booster pump 94 will not operate at low altitude, leaving the engine pump 10 to draw fuel through the nonrotating booster pump 94. If, under these conditions, the engine pump should jam, or otherwise fail, and the craft were a long way from its destination, the small amount of fuel left in the bottom of the tank 105 might be insufficient, and it would therefore be desirable if the booster pump 94 or 44 could pump from their full tanks through the stalled engine pump. This may be done, even at low altitude, in spite of the aneroid switch by closing the switch 255 on to the contact 259, which cuts around the aneroid switch, bringing current from the battery through 242, 268, 256, 259, 262, to 144, and either through 140 to 100, or through 138 to 90, as the operator may select. In this way, the booster pumps may substitute for a jammed engine pump at low altitudes.

Having described an embodiment of our invention, we claim:

1. In an aircraft, the combination of an engine, a manual switch, a carburetor, an air eliminator, an engine pump having its discharge side connected through said eliminator to said carburetor and having capacity in excess of engine consumption, a supercharger, a supercharger-controlled relief valve for returning excess fuel from the discharge side to the suction side of said engine pump and a by-pass valve for conveying fuel from said suction to said discharge side when said pump is inoperative, with the improved high altitude fuel system which comprises a plurality of fuel tanks, an electric motor driven booster pump for each tank, each said booster pump having its suction side connected to its tank, an electric motor driven auxiliary pump having its suction side connected to one of said tanks, each electric motor driven pump having a relief valve arranged to be controlled by the pressure of the surrounding air for returning excess fuel from the discharge side back to the intake side, and a by-pass valve for passing fuel from the suction to the discharge side when the pump is inoperative, a combined selector valve and selector switch, a common conduit connecting the suction side of the engine pump to said selector valve, separate conduits connecting said selector valve to the discharge sides of said booster pumps, the selector switch being so associated with the selector valve that when a tank is selected by said valve an electrical connection is made to the pump of the selected tank, a conduit connecting the discharge side of the auxiliary pump and of the engine pump together, a check valve in the last said conduit biasing to prevent flow from the discharge side of the engine pump to the discharge side of the auxiliary pump, a source of electrical energy, an air-pressure-controlled switch operative by the pressure of the surrounding air at a predetermined altitude to connect said source through the manual switch and the selector switch to the motor of the selected booster pump, a supercharger-controlled pressure-responsive switch operative at a preselected drop in pressure at the discharge side of the engine pump for connecting said source through the manual switch to the auxiliary pump motor, a control switch for manually disconnecting said source from said air-pressure-controlled switch and said supercharger controlled pressure-responsive switch, a priming switch for connecting said source to the auxiliary pump motor independently of the manual switch and a double-throw manual test and emergency switch operative one way for connecting said source through the selector switch to the selected booster pump motor independent of the manual switch, and the other way for connecting said source through the manual switch and the selector switch to the selected booster pump motor.

2. In an aircraft, the combination of an engine, a manual switch, a carburetor, an air eliminator, an engine pump having its discharge side connected through said eliminator to said carburetor and having capacity in excess of engine consumption, a supercharger, a supercharger-controlled relief valve for returning excess fuel from the discharge side to the suction side of said engine pump, and a by-pass valve, with the improved high altitude fuel system which comprises, a plurality of fuel tanks, an electric motor driven booster pump for each tank, each said booster pump having its suction side connected to its tank, an electric motor driven auxiliary pump having its suction side connected to one of said tanks, each electric motor driven pump having an atmospheric pressure controlled relief valve for returning excess fuel from the discharge side back to the tank to which it is connected, and a by-pass valve, a combined selector valve and selector switch, a common conduit connecting the suction side of the engine pump to the selector valve, separate conduits connecting said selector valves to the discharge sides of said booster pumps, the selector switch being so associated with the selector valve that when a booster pump is selected by said valve an electrical connection is made to the motor of the selected pump, a conduit for connecting the discharge side of the auxiliary pump to the discharge side of the engine pump, means for arresting backward flow in the last said conduit, a source of electrical energy, an aneroid switch operative at a predetermined altitude to connect said source through the manual switch and the selector switch to the motor of the selected booster pump, a supercharger-controlled pressure-responsive switch operative at a preselected drop in pressure at the discharge side of the engine pump for connecting said source through the manual switch to the auxiliary pump motor, a control switch for manually disconnecting said source from said aneroid switch and said supercharger controlled pressure-responsive switch, a priming switch for connecting said source to the auxiliary pump motor independently of the manual switch, and a manual emergency switch for connecting said source through the manual switch and the selector switch to the selected booster pump motor.

3. In an aircraft, the combination of an engine, a manual switch, a carburetor, an engine pump arranged to discharge into said carburetor and having capacity in excess of engine consumption, a supercharger, a relief valve for returning excess fuel from the discharge side to the suction side of the engine pump and arranged to have its relief point varied by variation in supercharger pressure, and a by-pass valve, with the improved high altitude fuel system which comprises a plurality of fuel tanks, an electric motor driven booster pump for each tank, each said booster pump having its suction side connected to its tank, an electric motor driven auxiliary pump having its suction side connected to one of said tanks, each electric motor driven pump having a relief valve controlled by the pressure of the ambient air for returning excess fuel from the discharge side back to the tanks to which it is connected, and a by-pass valve, a combined selector valve and selector switch, a common conduit connecting the suction side of the engine pump to said selector valve, separate conduits connecting said selector valve to the discharge sides of the booster pumps, the selector switch being so associated with the selector valve that when a booster pump is selected by said valve, an electrical connection is made to the motor of the selected pump, a conduit connecting the discharge sides of the auxiliary pump and of the engine pump together, means to stop flow in the last said conduit, a source of electrical energy, an aneroid switch operative at a predetermined altitude to connect said source through the manual switch and the selector switch to the motor of the selected booster pump, a supercharger-controlled pressure-responsive switch operative at a preselected drop in pressure at the discharge side of the engine pump for connecting said source through the manual switch to the auxiliary pump motor, a control switch for manually disconnecting said source from said aneroid switch and said supercharger-controlled pressure-responsive switch, and a double-throw manual test and emergency switch operative one way for connecting said source through the selector switch to the selected booster pump motor independently of the manual switch and the other way for connecting said source through the manual switch and the selector switch to the selected booster pump motor.

4. In an aircraft, the combination of an engine, a carburetor, a manual switch, a fuel metering device, an engine pump having its discharge side connected to said carburetor and having a capacity in excess of engine consumption, a supercharger, a supercharger-controlled relief valve for returning excess fuel from the discharge side to the suction side of said engine pump and a by-pass valve, with the improved high altitude fuel system which comprises a plurality of fuel tanks, an electric motor driven booster pump for each tank, each said booster pump having its suction side connected to its tank, an electric motor driven auxiliary pump having its suction side connected to one of said tanks, each electric motor driven pump having a relief valve for returning excess fuel from the discharge side back to the tank to which it is connected, and a by-pass valve, a combined selector valve and selector switch, a common conduit connecting the suction side of the engine pump to said selector valve, separate conduits connecting said selector valve to the discharge sides of said booster pumps, the selector switch being so associated with the selector valve that when a booster pump is selected by said valve an electrical connection is made to the motor of the selected pump, a conduit connecting the discharge side of the auxiliary pump to the discharge side of the engine pump, means for arresting flow in the last said conduit, a source of electrical energy, an aneroid switch operative at a predetermined altitude to connect said source through the manual switch and the selector switch to the motor of the selected booster pump, a supercharger-controlled pressure-responsive switch operative at a preselected drop in pressure at the discharge side of the engine pump for connecting said source through the manual switch to the auxiliary pump motor, a control switch for manually disconnecting said source from said aneroid switch and said supercharger-controlled pressure-responsive switch, and a manual emergency switch for connecting said source through the manual switch and the selector switch to the selected booster pump motor.

5. In an aircraft, the combination of an engine, a fuel metering device, an engine pump arranged to discharge into said metering device and having capacity in excess of engine consumption, a supercharger, a supercharger-controlled relief valve for returning excess fuel from the discharge side to the suction side of said engine pump, and a by-pass valve, with the improved high altitude fuel system which comprises a plurality of fuel tanks, an electric motor driven booster pump for each tank, each said booster pump having its suction side connected to its tank, an electric motor driven auxiliary pump having its suction side connected to one of said tanks, each electric motor driven pump having a relief valve for returning excess fuel from the discharge side back to the tank to which it is connected, and a by-pass valve, a combined selector valve and selector switch, a common conduit connecting the suction side of the engine pump to said selector valve, separate conduits connecting said selector valve to the discharge sides of said booster pumps, the selector switch being so associated with the selector valve that when a booster pump is selected by said valve an electrical connection is made to the motor of the selected pump, a conduit connecting the discharge side of the auxiliary pump to the discharge side of the engine pump, means for arresting flow in the last said conduit, a source of electrical energy, an aneroid switch operative at a predetermined altitude to connect said source through the said selector switch to the motor of the selected booster pump, a pressure-responsive switch operative at a preselected drop in pressure at the discharge side of the engine pump for connecting said source to the auxiliary pump motor, a control switch for manually disconnecting said source from said aneroid switch and said pressure-responsive switch and a manual emergency switch for connecting said source through the selector switch to the selected booster pump motor.

6. In an aircraft, the combination of an engine, a fuel metering device, an engine pump arranged to discharge into said metering device and having capacity in excess of engine consumption, a relief valve for returning excess fuel from the discharge side to the suction side of said engine pump, and a by-pass valve, with the improved high altitude fuel system which comprises a plurality of fuel tanks, an electric motor driven booster pump for each tank, each said booster pump having its suction side connected to its tank, an electric motor driven auxiliary pump having its suction side connected to one of said tanks, a combined selector valve and selector switch, a common conduit connecting the suction side of the engine pump to said selector valve, separate conduits connecting said selector valve to the discharge sides of said booster pumps, the selector switch being so associated with the selector valve that when a booster pump is selected by said valve an electrical connection is made to the motor of the selected pump, a conduit connecting the discharge side of the auxiliary pump to the discharge side of the engine pump, means for arresting flow in the last said conduit, a source of electrical energy, an aneroid switch operative at a predetermined altitude to connect said source through the selector switch to the motor of the selected booster pump, a pressure-responsive switch operative at a preselected drop in pressure at the discharge side of the engine pump for connecting said source to the auxiliary pump motor, a control switch for manually disconnecting said source from said aneroid switch and said pressure-responsive switch, and a manual emergency switch for connecting said source through the selector switch to the selected booster pump motor.

7. In an aircraft, the combination of an engine, a fuel metering device, an engine driven pump arranged to discharge into said metering device and having capacity in excess of engine consumption, and a by-pass valve, with the improved high altitude fuel system which comprises a plurality of fuel tanks, a power driven booster pump for each tank, each said booster pump having its suction side connected to its tank, a power driven auxiliary pump having its suction side connected to one of said tanks, a selector valve, a common conduit connecting the suction side of the engine pump to said selector valve, separate conduits connecting said selector valve to the discharge sides of said booster pumps, a conduit connecting the discharge side of the auxiliary pump to the discharge side of the engine pump, means for arresting flow in the last said conduit, a source of power, a selector switch having a common terminal and means operative coincidentally with said selector valve to electrically connect said common terminal to the motor of the selected booster pump, aneroid control means operative at a predetermined altitude to connect said source to the said common terminal, a pressure-responsive device operative at a preselected drop in pressure at the discharge side of the engine pump for connecting said source to the auxiliary pump, a control means for manually overriding said aneroid control means and said pressure-responsive device, and a manual emergency means for connecting said source to the selected booster pump.

8. In an aircraft, the combination of an engine, a fuel metering device and an engine pump discharging into said fuel metering device and the improved high altitude fuel system which comprises a plurality of fuel tanks, a power driven booster pump for each tank, each said booster pump having its suction side connected to its tank, a power driven auxiliary pump having its suction side connected to one of said tanks, a selector valve, a common conduit connecting the suction side of the engine pump to said selector valve, separate conduits connecting said selector valve to the discharge sides of said booster pumps, a conduit connecting the discharge side of the auxiliary pump to the discharge side of the engine pump, a source of power, a selector switch having a common terminal and means operative coincidentally with said selector valve to electrically connect said common terminal to the motor of the selected booster pump, aneroid control means operative at a predetermined altitude to connect said source to the said common terminal, a pressure responsive device operative at a preselected drop in pressure at the discharge side of the engine pump for connecting said source to the auxiliary pump and a control means for manually overriding said aneroid control means and said pressure responsive device.

9. In an aircraft, the combination of an engine, a fuel metering device and an engine pump arranged to discharge into said device and the improved high altitude fuel system which comprises a plurality of fuel tanks, a power driven booster pump for each tank, each said booster pump having its suction side connected to its tank, a power driven auxiliary pump having its suction side connected to one of said tanks, means for selectively connecting the suction side of the engine pump to the discharge sides of the booster pumps, a conduit connecting the discharge side of the auxiliary pump to the discharge side of the engine pump, a source of power, an electric switch having a common terminal and means operative in unison with said selective connecting means to electrically connect said common terminal to the motor of the selected booster pump, aneroid control means operative at a predetermined altitude to connect said source to the said common terminal, a pressure responsive device operative at a preselected drop in pressure at the discharge side of the engine pump for connecting said source to the auxiliary pump and a control means for manually overriding said aneroid control means and said pressure responsive device.

10. In an aircraft, the combination of an engine, a fuel metering device and an engine pump for discharging fuel thereinto and the improved high altitude fuel system which comprises a plurality of fuel tanks, a power driven booster pump for each tank, each said booster pump having its suction side connected to its tank, a power driven auxiliary pump having its suction side connected to one of said tanks, means for selectively connecting the suction side of the engine pump to the discharge sides of said booster pumps, a conduit connecting the discharge side of the auxiliary pump to the discharge side of the engine pump, a source of power, an electric switch having a common terminal and means operative in unison with said selective connecting means to electrically connect said common terminal to the motor of the selected booster pump, aneroid control means operative at a predetermined altitude to connect said source to the said common terminal and a pressure responsive device operative at a preselected drop in pressure at the discharge side of the engine pump for connecting said source to the auxiliary pump.

11. In an aircraft, the combination of an engine, a fuel metering device and a main fuel pump discharging thereinto and the improved fuel system which comprises a main fuel source, an emergency fuel source, a booster pump, an auxiliary pump, said main fuel pump having its suction side connected to said main fuel source through said booster pump, and said auxiliary pump having its suction side connected to said emergency fuel source, a conduit connecting the discharge side of the auxiliary pump to the discharge side of the main fuel pump, a source of power, aneroid control means operative at a predetermined altitude to connect said power source to the booster pump, and a pressure-responsive device operative at a preselected drop in pressure at the discharge side of the engine pump for connecting said power source to the auxiliary pump.

DAVID SAMIRAN.
JOHN S. MILLS.

REFERENCES CITED

The following references are of record in the file of this patent:

UNITED STATES PATENTS

| Number | Name | Date |
|---|---|---|
| 2,084,426 | Berry | June 22, 1937 |
| 2,325,931 | Avigdor | Aug. 3, 1943 |
| 2,330,558 | Curtis | Sept. 28, 1943 |

FOREIGN PATENTS

| Number | Country | Date |
|---|---|---|
| 805,064 | France | Nov. 10, 1936 |